Patented Aug. 8, 1933

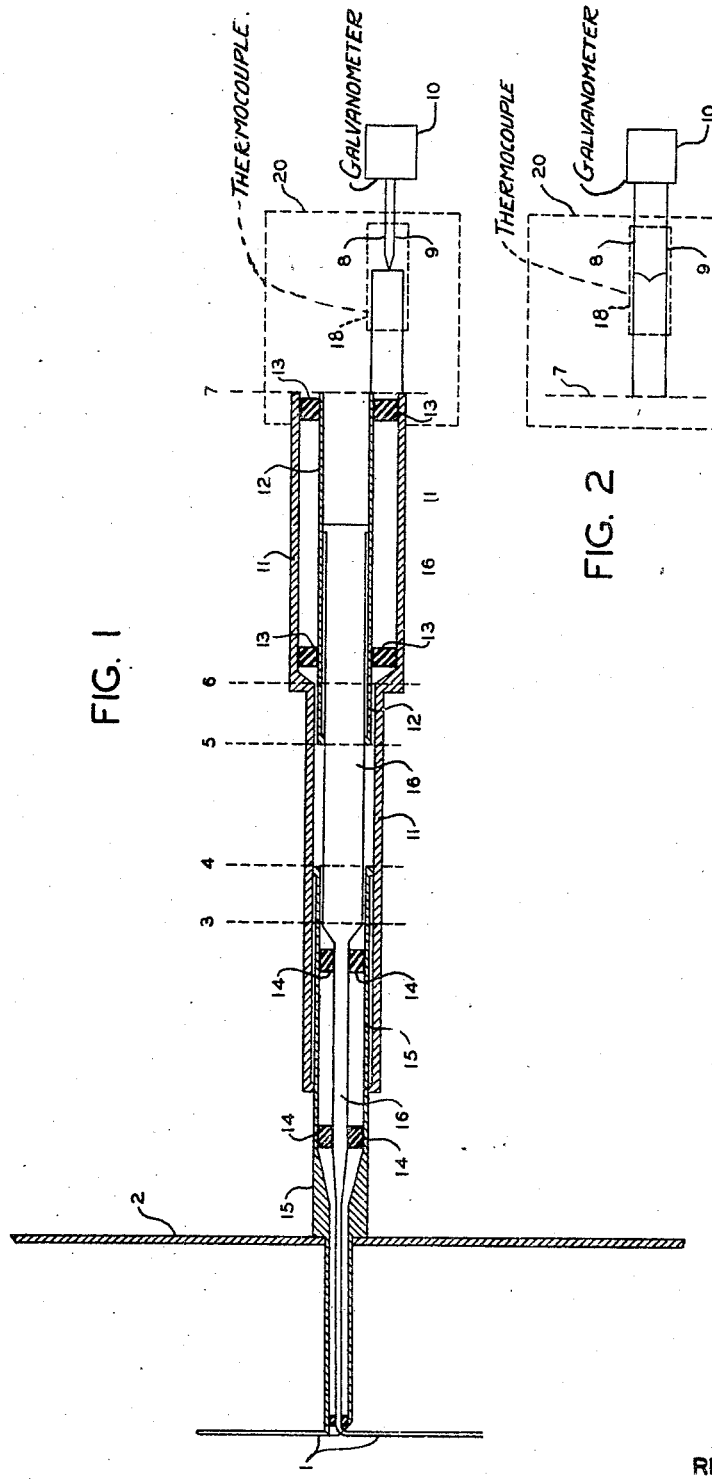

1,921,117

UNITED STATES PATENT OFFICE 1,921,117

WAVE-METER FOR ULTRA-SHORT WAVES

René Henri Darbord, Paris, France, assignor to International Communications Laboratories, Inc., New York, N. Y., a Corporation of New York Application July 10, 1931. Serial No. 549,927

3 Claims. (Cl. 250—39)

My invention relates to wave-meters for micro-rays, that is, electromagnetic waves lying generally in the range between 1 and 100 centimeters.

The wave-meter is provided with an antenna connected to a thermocouple by means of a transmission line composed of concentric conductors which adjust the relation between antenna and the thermocouple. A reflector is interposed between the antenna and thermocouple. The oscillating waves received by the antenna are transformed by the concentric conductor arrangement and the oscillations set up at the junction of the thermocouple produce an electromotive force, and a galvanometer connected to the thermocouple will then indicate the value of the current.

My invention is illustrated in the accompanying drawing, wherein

Fig. 1 shows the complete wave-meter assembly, and

Fig. 2 is a modification of the thermocouple.

Referring to Fig. 1, an antenna 1 is connected to the conductors 16 and 15 which are held in proper relation by the insulators or spacers 14. The thermocouple 18 is connected to the conductors 11 and 12 which overlap conductors 15 and 16. The conductors 11 and 12 are held in proper relation by the insulators or spacers 13.

It will be noted that the conductor 11 slidably engages conductor 15, while conductor 12 slidably engages conductor 16.

When the conductor 11 is moved, it carries with it the conductor 12 to form the proper cooperation with conductors 15 and 16.

The wave-meter as represented in the drawing is composed of a transmission line with concentric conductors connecting to the thermocouple 18, the receiving antenna 1 placed in front of the plane reflector 2. An important part of this line is comprised between the planes 3 and 6.

The length of the portion 4—5 of the line is varied by sliding the portions 11 and 12 with respect to the remainder of the set-up. This displacement may be made by means of a rack and pinion system not represented on the drawing. The deflection of the galvanometer 10 connected to the thermocouple 18 depends upon the length 4—5 and there is a position of resonance for every half wave-length. The wave-lengths are given by distances between two successive positions of resonance.

The portions 3—4 and 5—6 are quarter wave-length lines of very small characteristic impedance. These portions of the line play the part of transformers with a large ratio of transformation. Due to these transformers the resistances (and also the reactances) attached to each end of the portion of the line 4—5 are very small (for example, of the order of a tenth of an ohm). The resonance curve obtained will, therefore, be sharp and the resonance of wave-length very accurate. It might be thought that the portions of the line 3—4 and 5—6 cannot be a quarter of a wave-length for the whole range of wave-lengths; but calculation shows that, if their characteristic impedance is small and if their length is not too close to half a wave-length, they function as has been indicated. For example, it is possible to design the wave-meter allowing the measurement to nearly one part in a thousand of wave-lengths between 12 and 27 centimeters.

The characteristic impedance of the variable portion 4—5 should be relatively large with respect to those of portions 3—4 and 5—6, if it is desired to obtain a reactance quite large with respect to the resistances attached to the line 4—5, for a small displacement from the resonance position. At the same time, the distance between the concentric conductors must remain small if it is desired to avoid end effects.

As to the characteristic impedances of the portions of the line between the planes 1 and 3 and between the planes 6 and 7, it will be sufficient to have them large with respect to those of the portions 3—4 and 5—6. Under these conditions the resistances attached to the line 4—5 will be very small.

On the antenna end a line of small diameter is chosen to diminish the reaction between the antenna and the line. On the other hand, for mechanical reasons, the diameters of the sliding cylinders are relatively large. This is why the line is enlarged after crossing the mirror or reflector.

The distance of the antenna 1 to the reflecting plane 2 should be in the neighborhood of an odd number of quarter wave-lengths, and means for approximating the distance may be provided.

The heater is connected to the portion of the line 6—7 by a short line consisting of parallel wires. The galvanometer is connected to the thermocouple by the two conductors placed as close together as posible without touching. The thermocouple is located within a metallic container 20.

In Fig. 2 the heater 18 is connected to the portion of the line 6—7 by a short line consisting of parallel wires. On the drawing I have represented inside the dotted line a four-terminal thermocouple protected electrically by a metallic enclosure 20. The d. c. current is carried to the galvanometer 10 by the line 8—9. The length of line between the heater and the metallic container should be about a quarter of a wave-length. Unless this were done, the shunting effect would cause a diminution of the sensitivity.

The maximum deflection of the galvanometer is the same as if the quarter wave-length lines did not exist. At resonance the length of the line 4—5 is practically a half a wave-length, or a wave-length. It is as if the quarter wave-length lines 3—4 and 5—6 were directly connected. They then form a half wave-length line. Hence, it is as if the line at the left of the plane 3 was connected directly to the line at the right of the plane 6.

What is claimed is:

1. A micro-ray wave-meter comprising two sections of transmission line of fixed length and a section of transmission line of variable length intermediate said two sections, wherein for the range of frequencies to be measured the characteristic impedance of the variable length section is large as compared to that of either fixed length section, and means for adjusting the length of the intermediate section to indicate the length of the wave being measured.

2. A micro-ray wave-meter comprising three serially connected sections of transmission line the intermediate section being adjustable as to length, and for the frequencies to be measured the characteristic impedance of the intermediate section is large as compared to that of each of the other sections, the characteristic impedance of each of said other sections being of equal value.

3. A micro-ray wave-meter comprising a section of transmission line, a thermocouple connected thereto, a second section of transmission line adjustable as to length connected to the other end of the first section, a third section of transmission line connected to the free end of said second section, an antenna connected to the free end of said third section, the characteristic impedance of said second section for the range of frequencies to be measured being large as compared to that of either the first or the second said sections, and means for adjusting the said second section of the line whereby an indication of the length of the received wave may be obtained.

RENÉ H. DARBORD.